(12) United States Patent
Gunther et al.

(10) Patent No.: US 7,841,855 B2
(45) Date of Patent: Nov. 30, 2010

(54) INJECTION MOLDING NOZZLE

(75) Inventors: Herbert Gunther, Allendorf (DE);
Johannes Petrus Van Lieshout, Best (NL)

(73) Assignee: Gunther Heisskanaltechnik GmbH, Frankenberg (DE)

( * ) Notice: Subject to any disclaimer, the term of this patent is extended or adjusted under 35 U.S.C. 154(b) by 528 days.

(21) Appl. No.: 10/567,756

(22) PCT Filed: Aug. 13, 2004

(86) PCT No.: PCT/EP2004/009072
§ 371 (c)(1),
(2), (4) Date: May 16, 2008

(87) PCT Pub. No.: WO2005/018906
PCT Pub. Date: Mar. 3, 2005

(65) Prior Publication Data
US 2008/0226764 A1    Sep. 18, 2008

(30) Foreign Application Priority Data
Aug. 13, 2003  (NL) ..................... 1024099

(51) Int. Cl.
*B29C 45/23* (2006.01)
(52) U.S. Cl. ..................... 425/564; 425/566
(58) Field of Classification Search .................. 425/562, 425/563, 564, 565, 566
See application file for complete search history.

(56) References Cited
U.S. PATENT DOCUMENTS

| | | | |
|---|---|---|---|
| 3,553,788 A | 1/1971 | Putkowski | |
| 4,043,740 A | 8/1977 | Gellert | |
| 5,098,280 A | 3/1992 | Trakas | |
| 5,804,228 A | 9/1998 | Kofsman et al. | |

(Continued)

FOREIGN PATENT DOCUMENTS

DE         203 02 845        5/2003

(Continued)

*Primary Examiner*—Tim Heitbrink
(74) *Attorney, Agent, or Firm*—Clark & Brody

(57) ABSTRACT

A nozzle 10 used in injection molding comprises at least one runner 30 within a nozzle casing 20 to convey injection material to be processed. At its lower end, the runner 30 communicates, in flow-transmitting manner, through a nozzle orifice element 40 and an insert 50, with an injection mold cavity constituted by at least one mold insert 12, 13. The insert preferably is made in powder metallurgy form of a wear-resistant material and is configured in limited longitudinally displaceable manner in the nozzle orifice 40 in the lower end of the runner 30. Said insert 50 furthermore constitutes a gate aperture 18. In the embodiment mode of a needle shutoff nozzle 10, a shutoff needle 60 displaceable between an open and a closed position passes through the runner 30 and through the insert 50 which constitutes a centering element wherein an intake cone 54 centers the intrinsic sealing element 65 of the needle 60. The thermally highly conducting nozzle orifice element 40 encloses the upper part 53 of the insert 50 and can be screwed from below into the nozzle casing 20. Alternatively the nozzle orifice element 40 and the insert 50 are integral and both are inserted as a unit into the nozzle casing 20 to be jointly longitudinally displaceable therein. The insert/centering element 50 is fitted with a support flange 52 so that the nozzle orifice element 40 and/or the insert 50 be reliably affixed.

21 Claims, 9 Drawing Sheets

Figure 1:
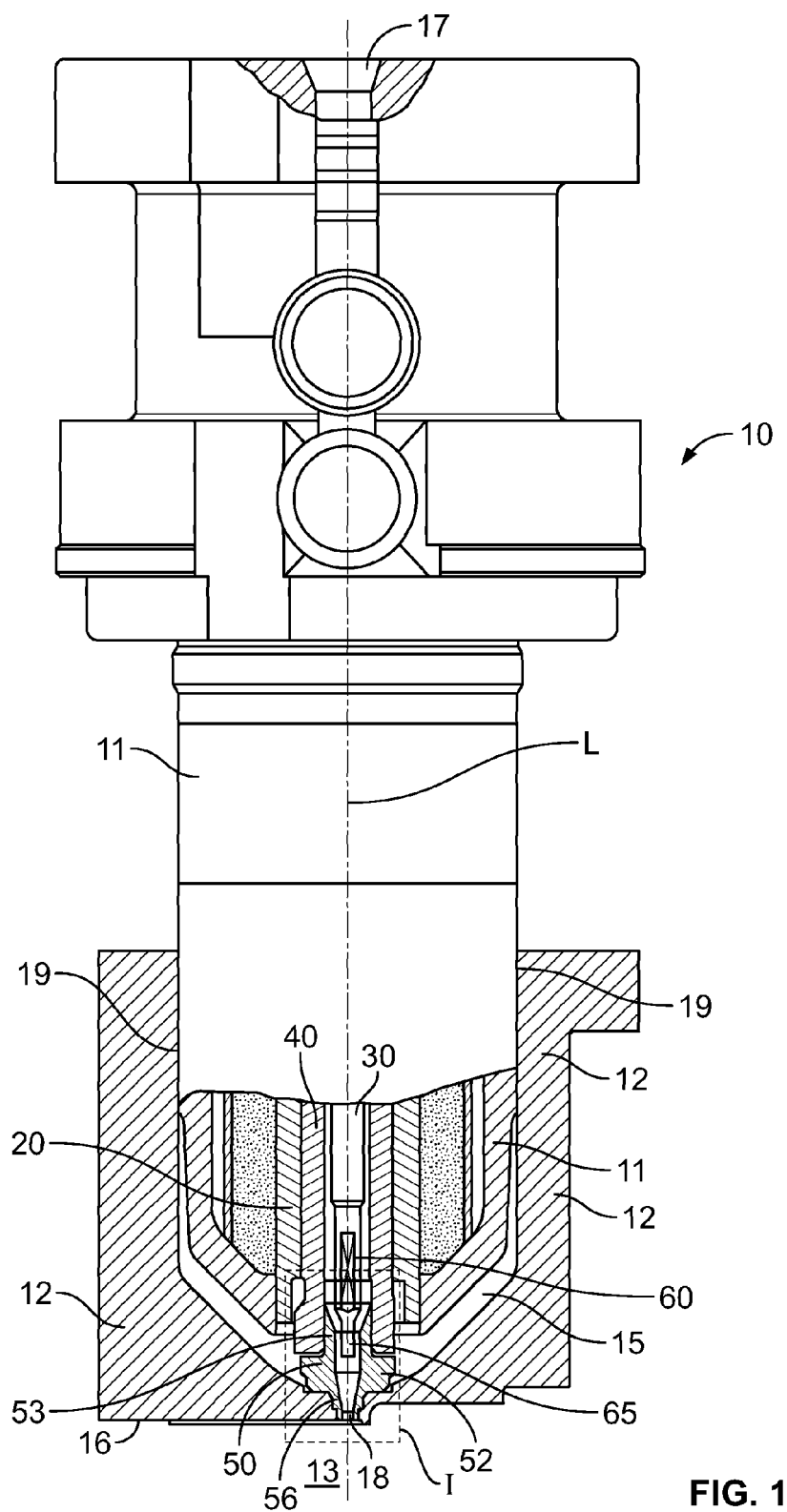

U.S. PATENT DOCUMENTS 6,769,901 B2 * 8/2004 Babin et al. .................. 425/549
2004/0146598 A1 7/2004 Sicilia et al.

FOREIGN PATENT DOCUMENTS

| | | |
|---|---|---|
| EP | 1 375 107 | 1/2004 |
| GB | 1271543 | 4/1972 |
| GB | 1348276 | 3/1974 |
| JP | 2003-11176 | 1/2003 |
| WO | 98/12038 | 3/1998 |
| WO | 03/070446 | 8/2003 |
| WO | 2004/073954 | 9/2004 |

* cited by examiner

INJECTION MOLDING NOZZLE

The present invention relates to an injection molding nozzle applicable to an injection mold.

In general injection molding nozzles, and in particular hot or cold runner nozzles, are used to feed a fluid material, in particular a melt, to a separable mold block (mold insert). They usually comprise a thermostatted nozzle casing fitted with a flow or melt duct issuing at or in the nozzle orifice element and allowing flow communication with a mold cavity constituted by the mold insert of the injection mold. To keep the melt at a constant temperature as far as the mold insert, the nozzle orifice element, which is inserted firmly from below into the nozzle casing, is made of a thermally highly conducting material. An air gap to act as thermal insulation is subtended between the injection casing and the mold.

This design incurs the drawback that the wear of the nozzle orifice element may be fairly high in particular when processing materials containing abrasive components. Accordingly the conventional nozzle orifice elements must be replaced at regular time intervals at commensurate loss of time.

The same problem arises with needle-control nozzles. Most of the time they are fitted with pneumatically or hydraulically driven sealing needles which are moved periodically from an open into a closed position. To preclude damages occurring in this procedure to the nozzle orifice element as well as to the mold, needle guidance must be as accurate as possible.

As a remedy, illustratively the German patent document DE 32 45 571 C2 proposes that the sealing needle be stepped at its lower end so that the intrinsic sealing element of this needle be fitted with an enlarged check (stop) edge. The nozzle orifice element constitutes a pre-centering element fitted with an intake funnel cooperating in such manner with the sealing needle's check edge that, during closure, the front sealing edge of the preferably cylindrical sealing element shall always be inserted in contact-free manner into the nozzle orifice element.

In order to reduce the wear of the precentering element firmly integrated into the nozzle casing, said element is made of a high-strength material. Even with this feature, the orifice element still must be replaced at regular intervals, entailing corresponding costs. Moreover the temperature distribution in the gate aperture zone and the sealing seat is disadvantageous. Moreover both are situated in the mold insert. If the insert must be replaced because of wear, high costs are inevitable.

The German patent document 31 24 958 A1 (=U.S. Pat. No. 4,286,941) circumvents the above drawbacks by providing a terminally conical nozzle seal between the mold insert and the nozzle casing. Said seal runs across the insulating air gap into a matching aperture in the mold insert. The inner borehole of the nozzle seal also is conical. By subtending a gate opening, said aperture receives the tapered end of the valve needle in its closed position. The nozzle seal is firmly integrated into the nozzle casing, it is made of a thermally poorly conducting material, and it constitutes a portion of the mold nest wall.

This design does implement thermal insulation between the externally heated nozzle casing of the needle shutoff nozzle and the cold mold. However it fails to provide the thermally highly conducting nozzle orifice element to assure uniform temperature distribution as far as the mold insert. The nozzle seal can be replaced only in fairly complex manner requiring many tools. In another disadvantageous characteristic, the nozzle seal in the mold inserts is not supported in reproducible manner, and as a result different thermal expansions between the end face of the nozzle seal and the mold nest wall may lead to offsets that might affect production.

The European patent document EP 0 638 407 A1 discloses an injection molding nozzle comprising a nozzle casing receiving at one end and in firmly affixed manner a thermally highly conducting nozzle orifice element to improve temperature distribution. The said orifice receives end-wise a hardened steel centering bush which by its free end engages a shoulder in the mold insert. The centering bush centers a sealing needle which by means of a cylindrical sealing element seals a very short cylindrical portion of the gate borehole in the mold insert. Again the centering bush touches the mold insert only over a minimal depth so as to minimize the heat transfer from the hot runner nozzle to the mold insert.

The above design incurs the drawback that both the nozzle orifice element and the centering bush are firmly affixed in the nozzle casing and therefore the wear-susceptible parts cannot be easily replaced. Furthermore the exceedingly restricted seat in the mold insert may be problematical during assembly, because an expansion joint must remain in place between the centering bush and the shoulder in the mold nest to allow compensating the thermal expansion of the nozzle casing. If the centering bush is not properly engaged by the exceedingly compact seat in the mold nest, damages may arise when heating the hot runner nozzle, in particular if the centering bush were to tilt. Said design incurs another drawback in that the centering bush does not go as far as the mold nest, that is, the sealing seat is situated in the mold insert. Because the sealing needle only closes off a very short cylindrical segment of the gate borehole, leaks may arise quickly due among other causes to the difficult-to-control thermal expansions.

A substantive goal of the present invention is overcoming the above and other drawbacks of the state of the art and to create an injection molding nozzle for an injection mold and manufactured economically using simple means and also allowing simple and rapid replacement of the nozzle orifice element and/or an insert therein. All adverse effects due to temperature distribution and thermal expansion effects shall be widely eliminated. Furthermore, as regards the embodiment of the injection molding nozzle as a needle shutoff nozzle, the present invention offers permanently accurate and precise needle guidance and sealing allowing constantly reliable operation even under high load interactions.

When using an injection molding nozzle in an injection mold, where the nozzle is fitted with a casing comprising at least one flow duct for injection material to be processed, said duct ending at or in a nozzle orifice element and by means of an insert situated end-wise at or in the nozzle orifice element being connected flow-wise to at least one injection mold cavity constituted by an insert, the present invention provides that the nozzle orifice element configured in the nozzle casing and/or the insert configured in the nozzle orifice element shall be longitudinally displaceable and shall be firmly clamped in place between the nozzle casing and the mold insert.

The longitudinally displaceable seat makes it possible to quickly and conveniently remove the nozzle orifice element and/or the insert inserted into it. Tools or other accessories are no longer needed. Nevertheless the nozzle orifice element, also the insert, shall be reliably secured during injection mold operation, namely being clamped between the nozzle and the mold inserts. Additional features or accessories to affix the nozzle orifice element, i.e. the insert, no longer are required. The injection molding nozzle can be re-used several times.

Another considerable advantage of the present invention is to minimize the conversion time required to exchange the nozzle orifice element and/or the insert guided longitudinally therein, offering economy of molding costs. Repairs too are more economical.

Advantageously too, the insert may at any time be quickly and conveniently exchanged for another structure or embodiment, for instance when instead of using an injection molding nozzle having an open gate or a nozzle tip, a needle shutoff nozzle shall be employed, or when the diameter of the gating point must be changed.

The injection molding nozzle of the present invention may be may be a hot runner or a cold runner nozzle.

The flange constituted at the insert is a reliable rest surface for the insert both at the nozzle orifice element and at the mold insert. Furthermore good thermal insulation between the injection molding nozzle and the mold is attained. On the other hand, the insert is pre-vented from excessively cooling, whereby the danger of cold clogging material within the runner is reduced. The thermally highly conducting nozzle orifice element in fact assure optimal temperature distribution reaching as far as the mold inserts.

Furthermore the insert flange offers a tangible reference surface allowing very accurately adjusting the insert position and therefore the distance between the nozzle orifice element and the mold insert. The insert per se centers the nozzle casing relative to the mold inserts, the gate aperture preferably being configured in the insert. This insert in turn constitutes a portion of the mold nest wall, and accordingly the gating point is hardly visible.

Further features, details and advantages of the present invention are elucidated below by the claims and in relation to the embodiments described in reference to the appended drawings.

Figure 2:
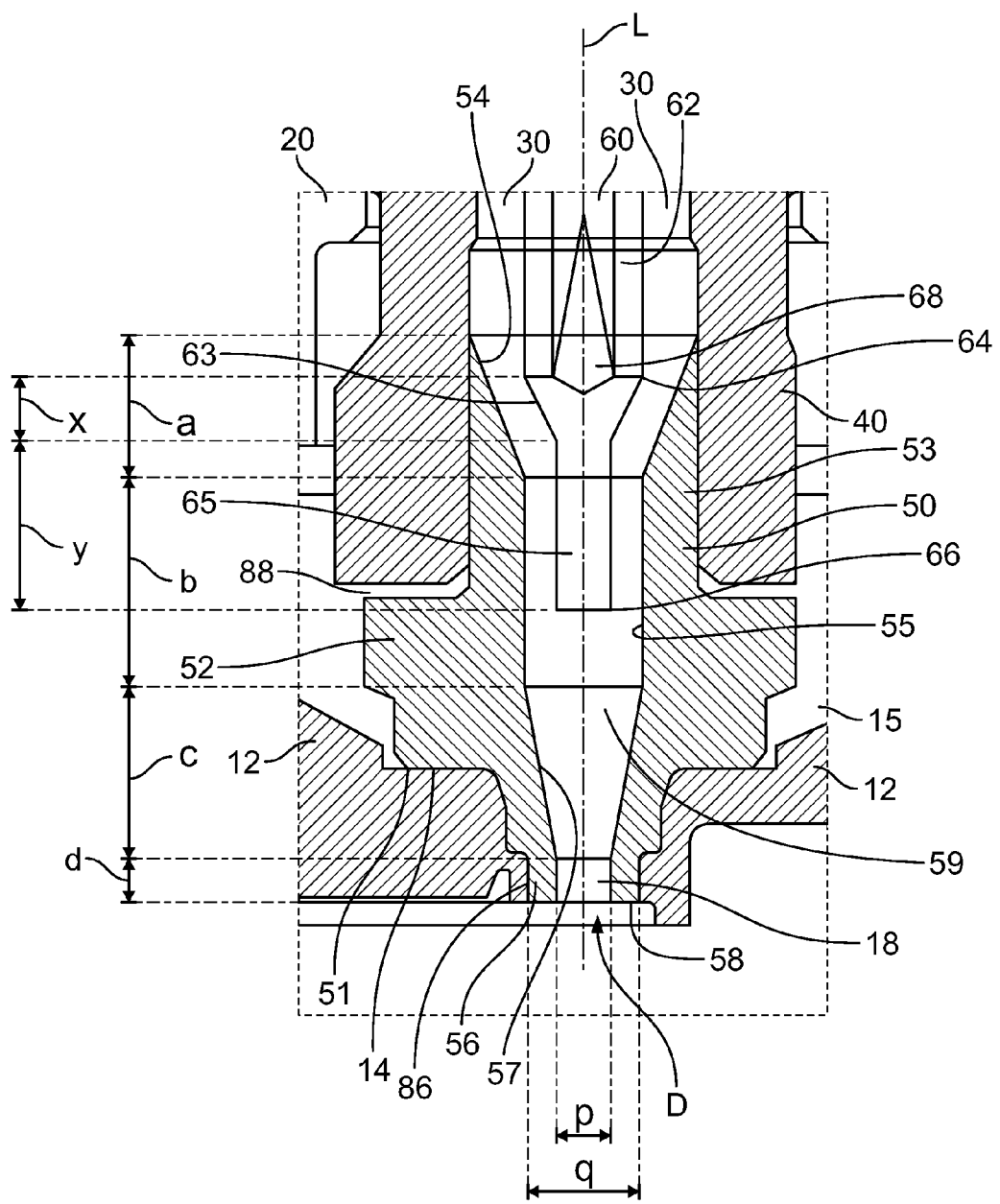
Figure 3:
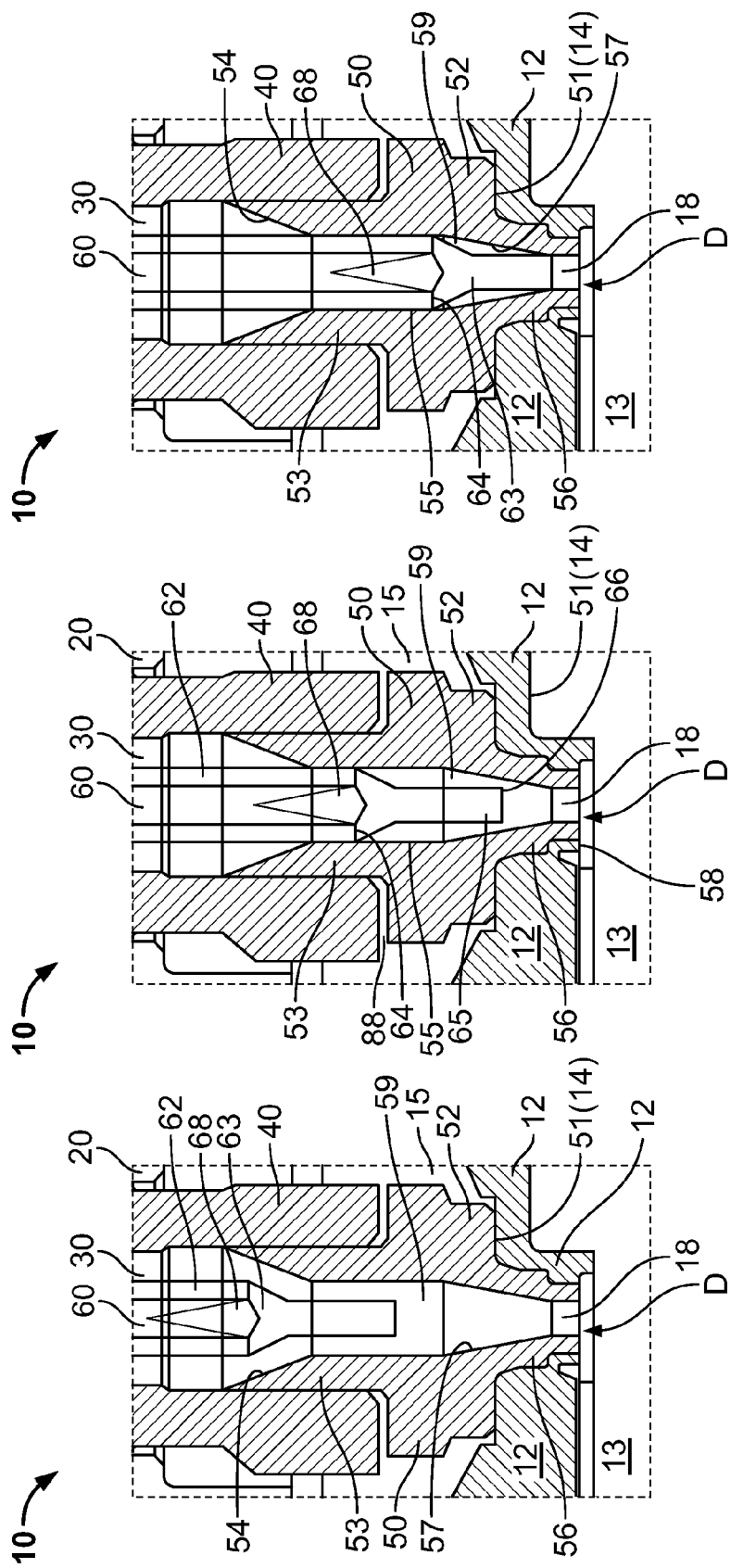
Figure 4:
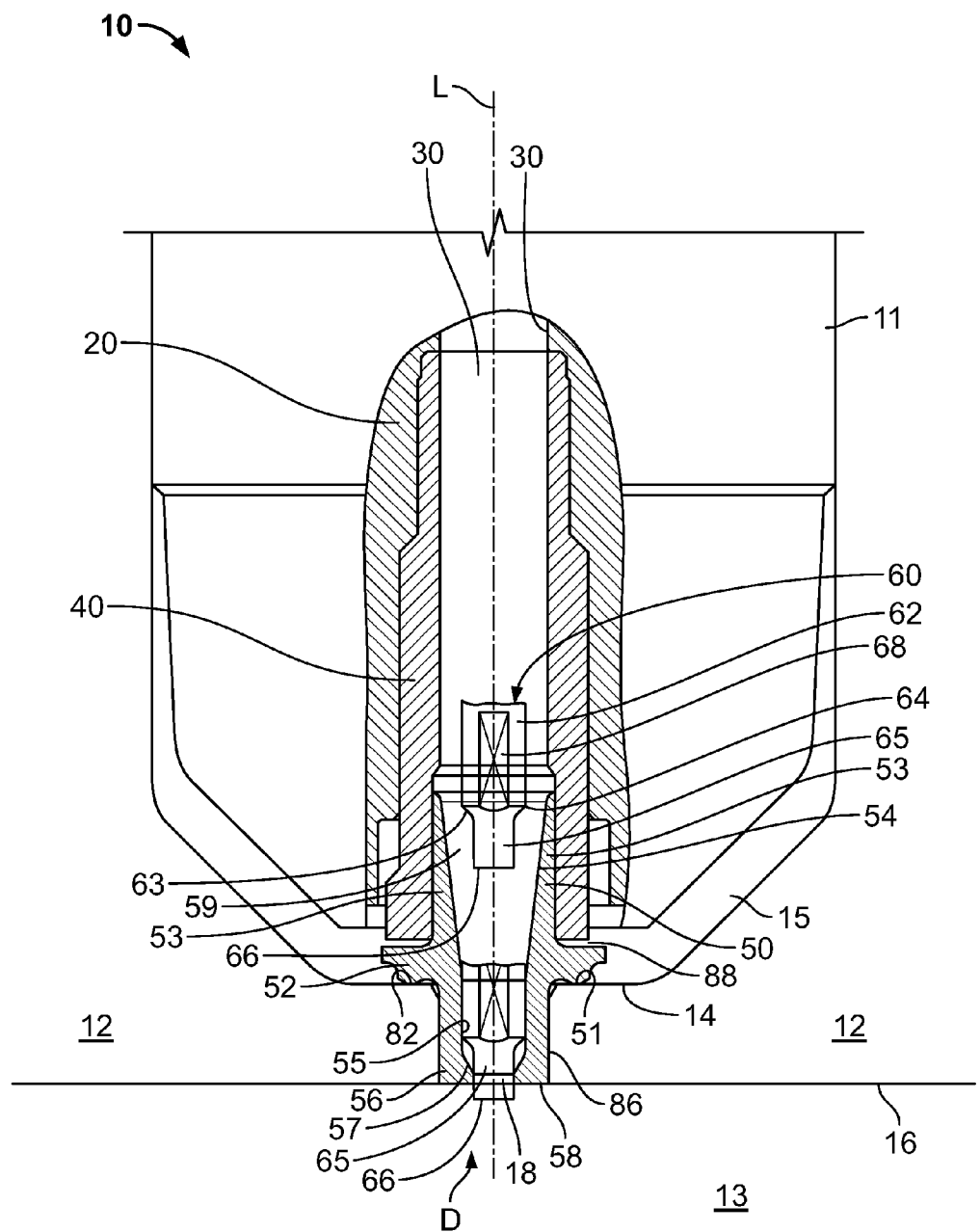
Figure 5:
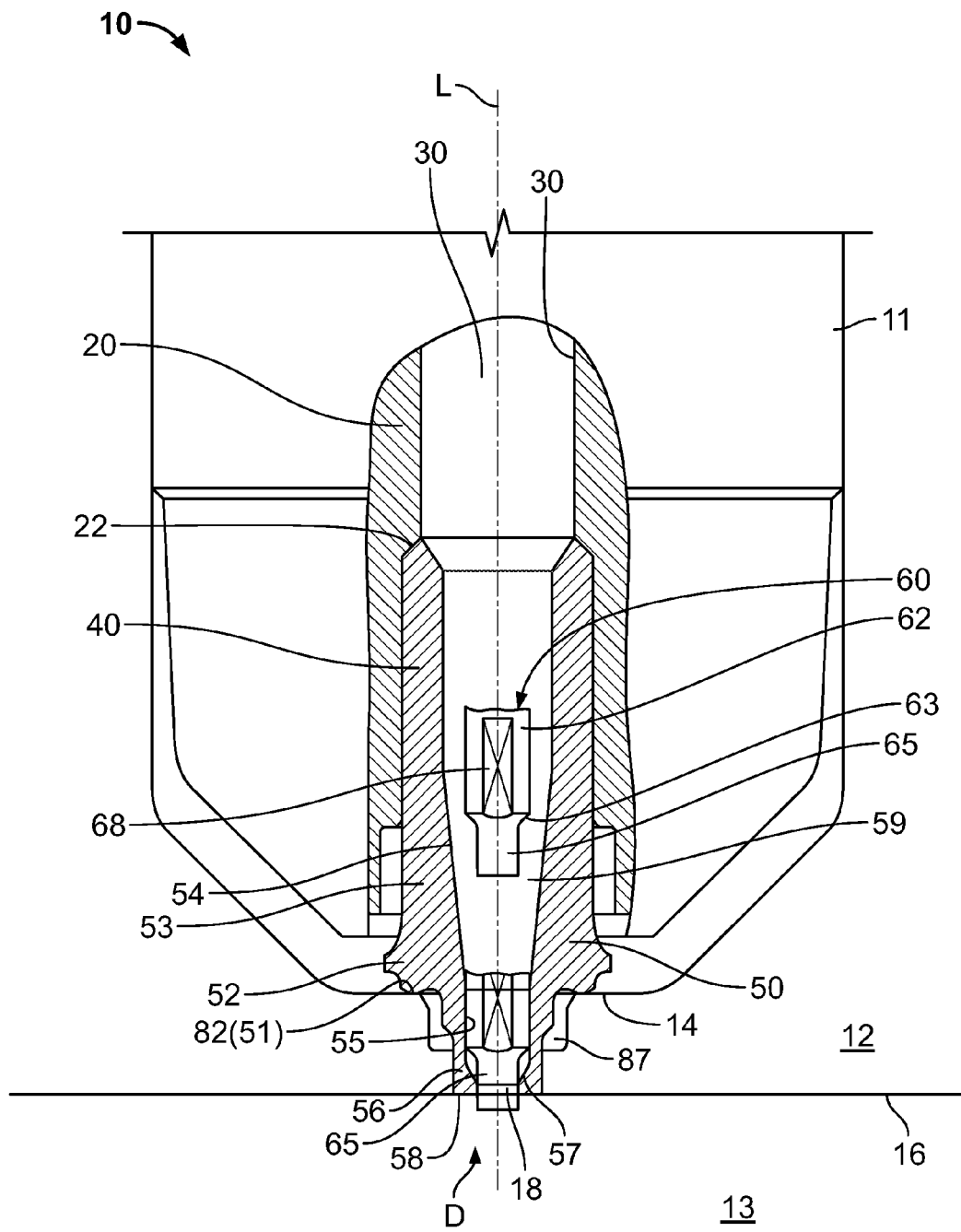
Figure 6:
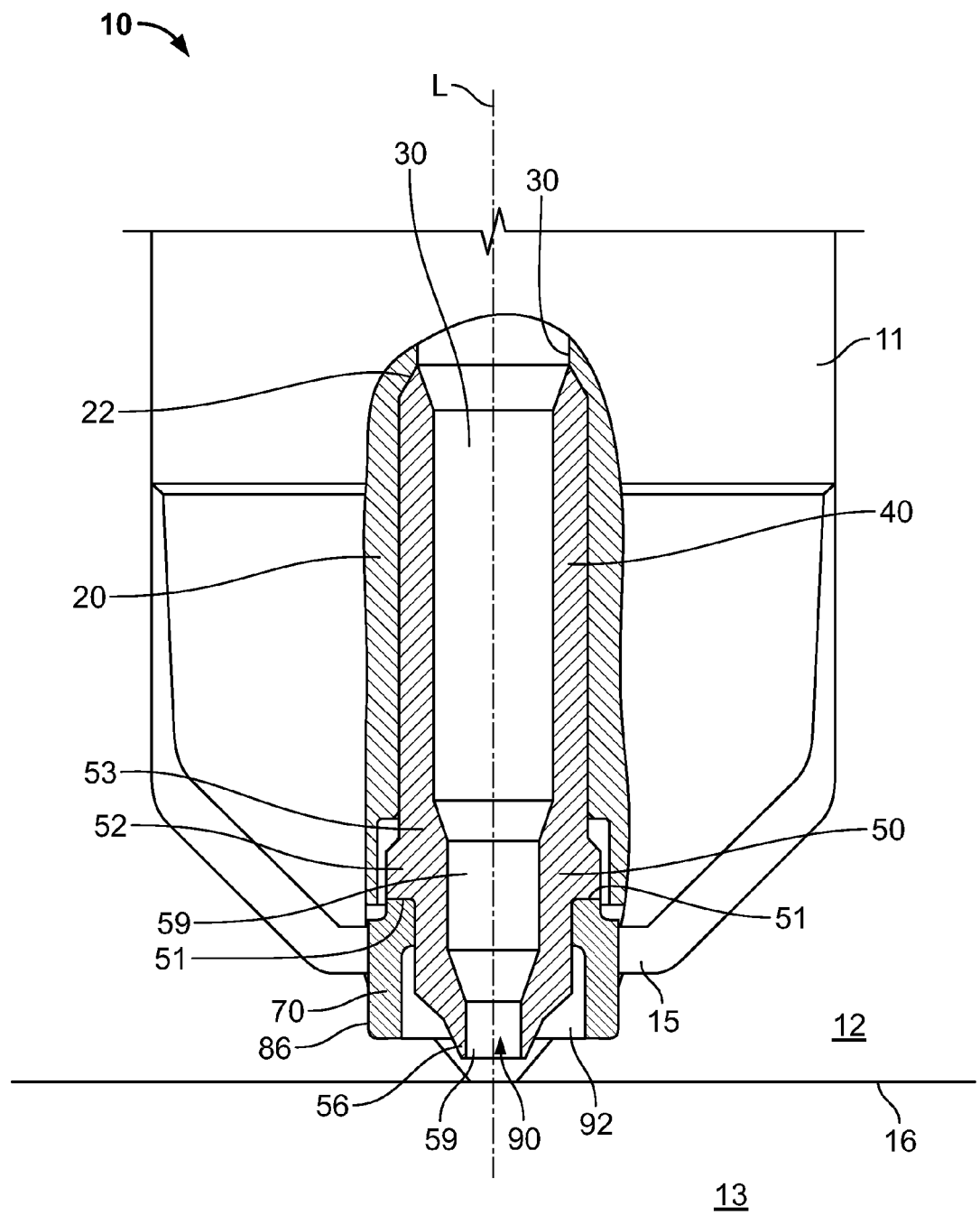
Figure 7:
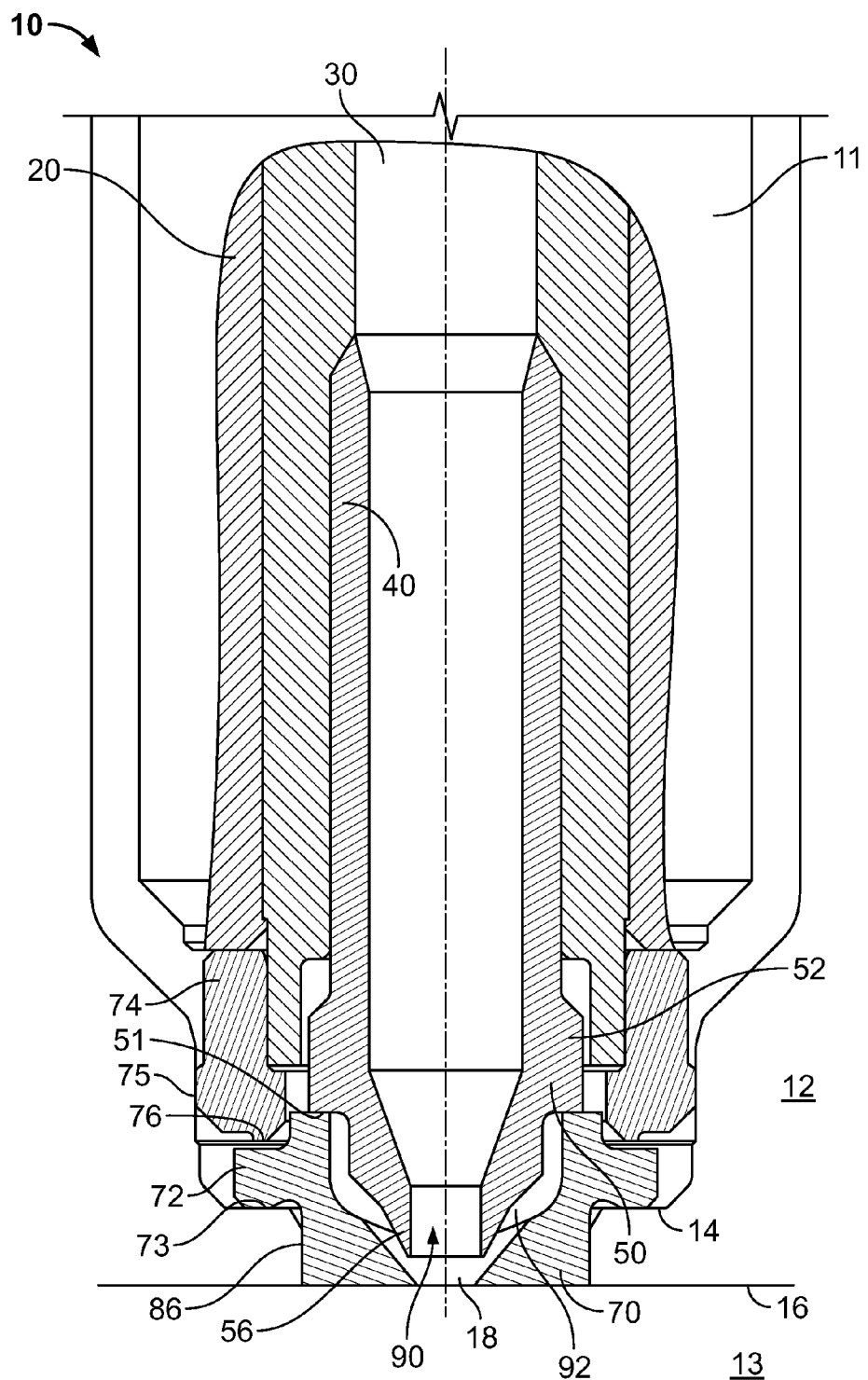
Figure 8:
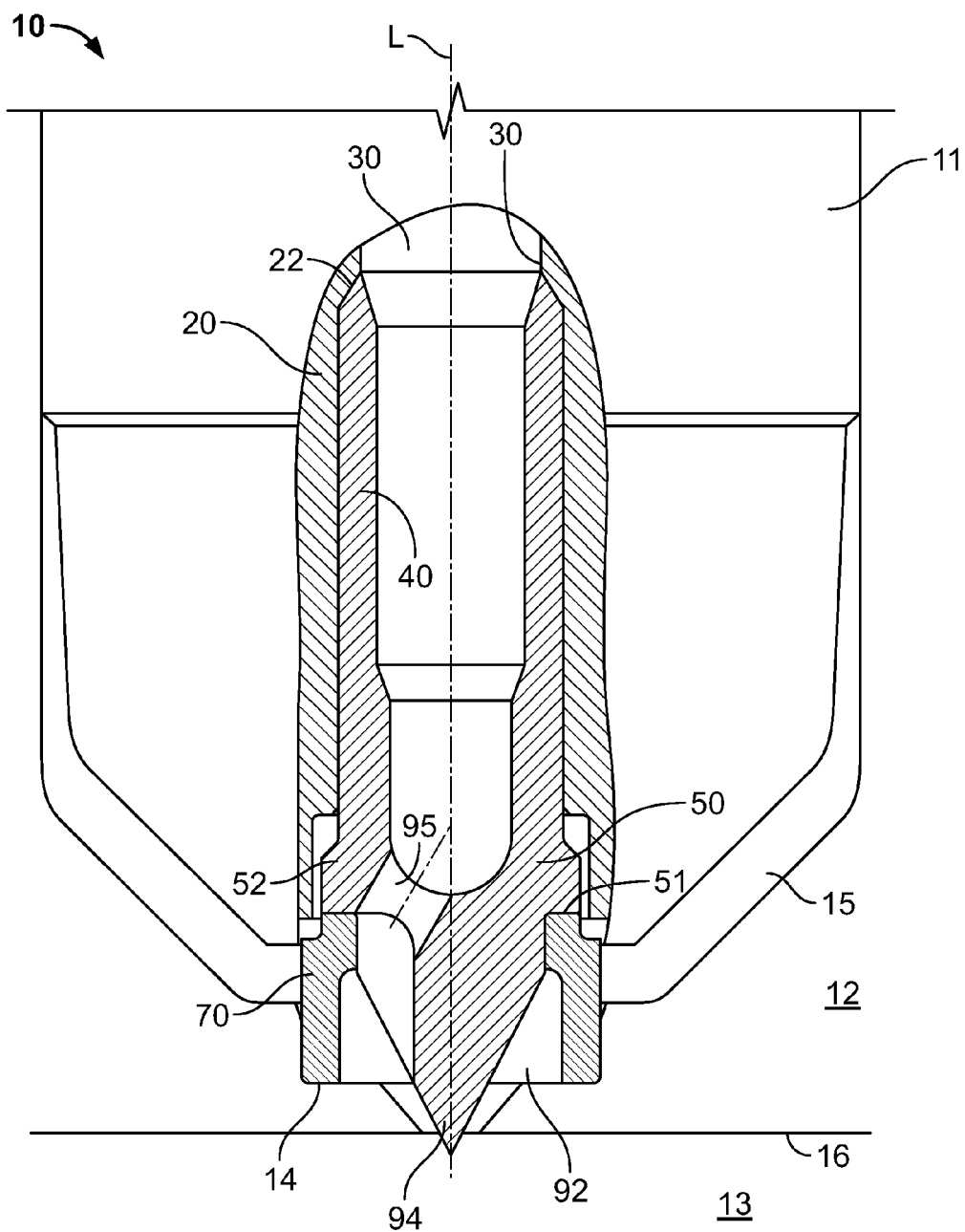
Figure 9:
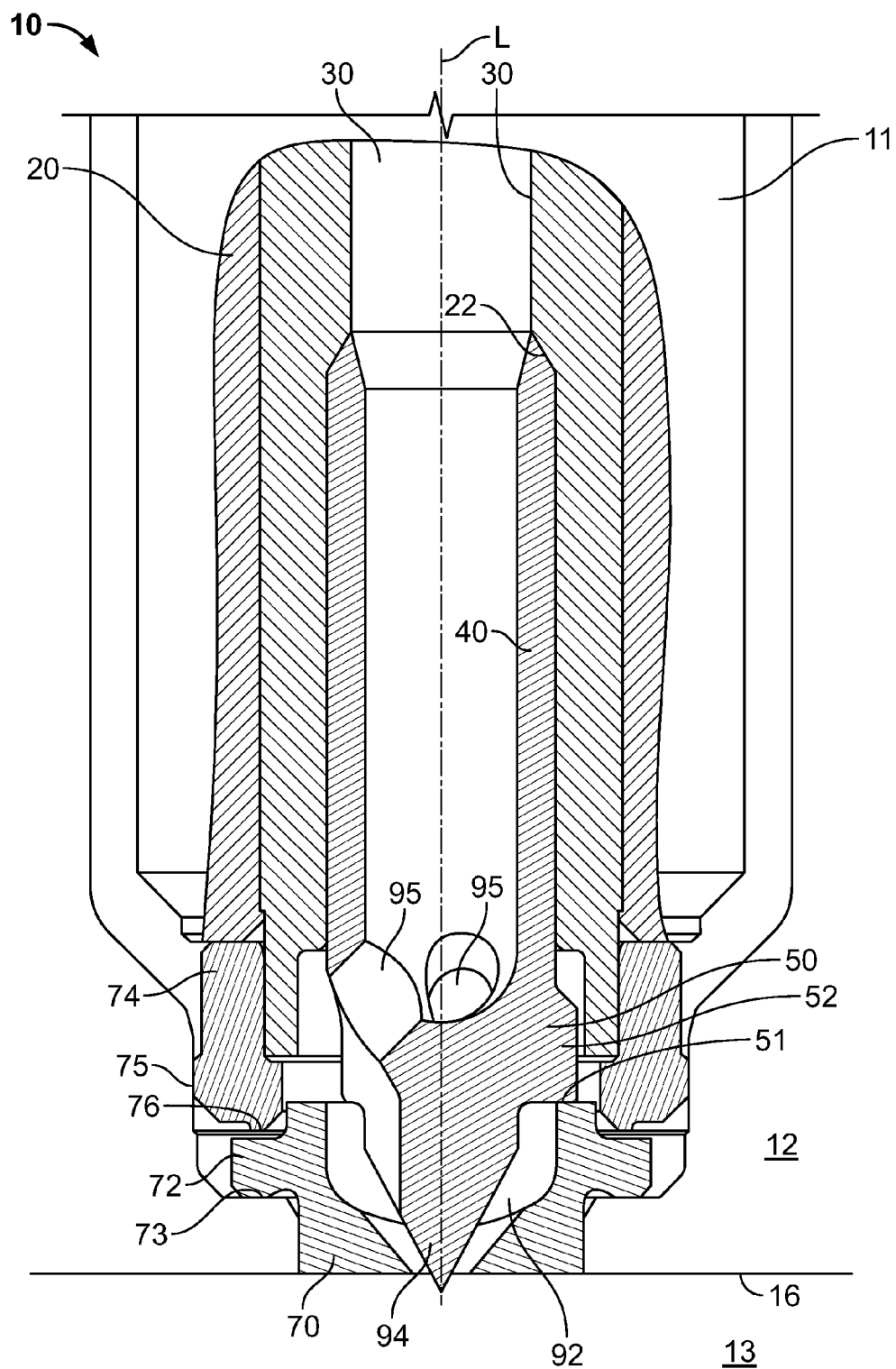

FIG. 1 is a partly cross-sectional sideview of an injection molding nozzle in the form of a needle shutoff nozzle, FIG. 2 is an enlarged cutaway of the needle shutoff nozzle of FIG. 1, FIGS. 3a-c show the shutoff needle of the needle shutoff nozzle of FIG. 1 in different positions, FIG. 4 is an enlarged elevation of the lower portion of another embodiment of a needle shutoff nozzle partly seen in cross-section, FIG. 5 is an elevation similar to that of FIG. 4 but of modified design, FIG. 6 is an injection molding nozzle with open gate, FIG. 7 shows the injection molding nozzle of FIG. 6 of a modified design, FIG. 8 shows an injection molding nozzle with a nozzle tip, and FIG. 9 shows the injection molding nozzle of FIG. 8 as a modified embodiment mode.

The injection molding nozzle denoted overall by 10 in FIG. 1 is a needle shutoff nozzle and is part of an injection mold (not shown in further detail). This injection molding nozzle 10 comprises a preferably externally heated nozzle casing 20 within a housing 11, a runner duct, hereafter runner 30, being configured concentrically with a longitudinal axis L within said casing. A melt to be processed, for instance a metallic, silicone or plastic melt, is fed through the runner 30 from a material feed aperture 17 to a mold nest (not shown in further detail). This mold nest is configured between mold inserts 12, 13 that are affixed to omitted mold plates.

A nozzle aperture element 40 made of a thermally highly conducting material is inserted, preferably by screwing, from below into the nozzle casing 20, and extends the runner 30 downward. The nozzle orifice element 40, the nozzle casing 20, the housing 11 and the mold inserts 12 bound an air gap 15 thermally insulating the needle shutoff nozzle 10 from the mold inserts 12. Above the air gap 15, the housing 11 of the needle shutoff nozzle 10 is received in the mold inserts 12 where a contact surface (not elucidated further) may act as pre-centering element 19.

A wear-resistant insert 50 is configured in axially displaceable manner between the nozzle orifice element 40 and the mold inserts 12 and centers the needle shutoff nozzle 10 relative to the mold inserts 12, and, just as does the airgap 15, provides thermal insulation between the nozzle orifice element 40 and the mold inserts 12, that is, the thermally highly conducting nozzle orifice element 40 is kept at a constant, high temperature reaching as far as the mold nest. At the same time, the centering element 50 precludes the cooled mold inserts 12 from being heated.

FIG. 2 is the enlarged cutaway I of FIG. 1. As seen, the centering element 50 as a whole is rotationally symmetrical about the longitudinal axis L. Said element is fitted with a flange 52 and a narrow, cylindrical neck segment 53. This neck segment is inserted from below into the runner 30, i.e. into the nozzle orifice element 40, and is guided therein in longitudinally displaceable manner.

At its end facing the mold nest, the centering element 50 comprises an end element 56 which is also cylindrical and which constitutes a runner aperture 18 that is coaxial with the longitudinal axis L and that also is longitudinally displaceable within a cylindrical seat 86. This centering seat 83 subtended by the mold inserts 12 is coaxial with the gate aperture 18 and may be stepped and/or conical in its upper zone, whereby the centering element 50 shall always be received in the seat 86 in problem-free manner during its assembly into its end element 56 and the needle shutoff nozzle 10 always shall be reliably centered during assembly.

The outside diameter of the end element 56 is geometrically tightly matched to the mold inserts 12 whereby the melt is precluded from entering the air chamber 15. Longitudinal displacement of the centering element 50 in the seat 86 nevertheless is feasible to allow compensating any thermally caused changes in length of the needle shutoff nozzle 10. This feature also applies to the neck segment 53. The outside diameter of said neck segment 53 also is tightly matched geometrically to the inside diameter of the nozzle orifice element 40 to secure both longitudinal displaceability and a sealed connection.

The illustratively flat end face 58 of the end element 56 bounds part of the mold nest, said end face 58 and the unreferenced mold nest wall substantially being mounted flush, as a result of which the gating point is masked from view on the product to be made.

The runner 30 of the needle shutoff nozzle 10 is continued by the centering element 50. For that purpose said element subtends a passage 59 terminating in the gate aperture 18 whereby, due to the central alignment of the hot runner nozzle 10, the melt always can flow unhampered into the mold nest.

An axially displaceable shutoff needle 60, which opens and closes the gate aperture 18, passes in longitudinally displaceable manner through the runner 30 and through the nozzle orifice element 40 and it can be moved by an omitted pneumatic drive from an open position into a closed position. The diameter of the shutoff needle 50 is repeatedly stepped along the longitudinal axis L and is cylindrical at least in some segments, and it comprises at its end a sealing element 65 which, in the shutoff position, engages, via the end zone 56 of the centering element 50, the gate aperture 18 that simultaneously constitutes a cylindrical sealing seat D for the shutoff needle 60.

The transition from the large-diameter to the small-diameter needle segments may be conical or round, a check edge 64 being subtended between a needle zone 62 and the adjoining shutoff element 65, the diameter of said edge 64 being larger than that of the terminal sealing edge 66 of the sealing element 65 of the shutoff needle 60.

Cooperating with the centering element 50, the receiving edge 64 will center the shutoff needle 60 in case this needle is deflected from its concentric position in the runner 30 in order that the susceptible sealing element 65 be preserved from damage and the gate aperture 18 always be sealed in pressure-proof manner. For that purpose the neck segment 53 of the centering element 50 comprises a first intake cone 54 which merges concentrically with the longitudinal axis L into a cylindrical guide segment 55 of which the inside diameter is slightly larger than the outside diameter of the needle zone 62 of the shutoff needle 60. A second cone 57 is configured in front of the gate aperture 18 in the centering element 50 and reduces the inside diameter of the guide segment 55 to the diameter of the sealing element 65 of the shutoff needle 60.

During operation, a free-flowing material is fed through the material intake aperture 17 to the needle shutoff valve 10. Said material flows through the runner 30, the nozzle orifice element 40, the passage 59 and the gate aperture 18 into the mold nest. A displacement gap 88 situated for instance between the nozzle aperture element 40 and the insert 50 is sized in a manner that the nozzle casing 20 and the nozzle orifice element 40 may expand unhampered until the operating temperature is reached. Once the operating temperature has been reached, the insert 50 shall be firmly clamped by means of the nozzle orifice element 40 between the nozzle casing 20 and the mold inserts 12, the underside of the flange 52—which is constituted by the visible widening of the insert 50—constituting a lower contact surface 51 coming to rest on a step 14 of the mold inserts. The (unreferenced) height of the terminal element 56 of the insert 50 is dimensioned in a way that the mold nest boundary concurrently constituted by the end face 58 always shall be flush. The upper side of the flange 52 bounding the gap 88 rests in geometrically interlocking manner against the lower end face of the nozzle orifice element 40, whereby the flange 50 is always securely held in position.

When, as shown in FIGS. 3a through 3c, the shutoff needle 60 moves from its open into its closed position, then the check edge 64 and the first intake cone 54 will automatically align it concentrically with the longitudinal axis L, the needle segment 62 being guided within the guide segment 55 of the centering element 50 in position-stable manner until the shutoff element 65 has been moved into the sealing seat D (FIG. 3c). The relatively delicate sealing edge 66 of the shutoff needle 60 then is precluded from resting either against the nozzle orifice element 40 or the centering element 50 because the length x+y from the check edge 64 to the sealing edge 66 is smaller than the length b+c of the guide segment 55 and the second cone 57. Contact between the check edge 64 and the intake cone 54 will not raise problems because the preferably slightly rounded check edge 66 of the shutoff needle 60 is not designed for sealing and the centering element 50 preferably is made of a wear-resistant material.

To preclude undesired back-pressure within the melt during the closure of the shutoff valve 60, ribs, axial strips or the like (not shown) may be fitted into the intake cone 54 in the centering element 50 to enclose the shutoff needle 60 concentrically and in gliding manner. In addition or alternatively and as shown in FIG. 2, the shutoff needle 60 may be fitted laterally with bulges or recesses in the region of the needle segment 62,68 allowing the melt displaced by the shutoff needle 60 to flow back into the runner 30. In FIG. 2 the recess 68 is shown having substantially a V-shape.

As shown in FIG. 3c, the shutoff needle 60 by means of its shutoff element 65 or by its end face (not referenced) seals off flush with the insert 50, as a result of which the gating mark on the injection molded article is barely visible. Where called for, the shutoff element also may be embossed.

When the insert 50 must be replaced—for instance having reached its maximum service life—then first the supply of liquid plastic through the material feed aperture 17 shall be interrupted. Next either the needle shutoff nozzle 10 is removed from the mold or the mold inserts 12, 13 are removed. As soon as the insert 50 is accessible, no more need be done than withdrawing it out of the nozzle orifice element 40 and replacing it with a new insert 50. No tool is required in this procedure. Indeed the insert 50 is rapidly and conveniently removed and then reinserted equally rapidly and conveniently. The cost in time and labor is minimal.

In equally simple manner, the insert 50 also allows altering the diameter of the sealing seat D for instance when a different shutoff needle 60 or another gate orifice 18 must be used. The sealing seat D being configured in the insert 50, the shutoff needle 60 always is able to reliably close the nozzle 10. Thermal changes in length of the nozzle 10 therefore do not affect sealing.

The injection molding nozzle 10 shown in FIG. 4 also is a needle shutoff nozzle. It comprises a longitudinally displaceable shutoff needle 60 fitted with an upper segment 62 of a relatively large diameter which tapers along a conical or rounded transition segment 63 into a shutoff element 65.

A displaceable insert 50 acting as a centering element both for the shutoff needle 60 and the nozzle 10 enters the lower end of the nozzle orifice element 40. The centering element 50 for that purpose is fitted with an upper neck segment 53 which may be axially moved into the nozzle orifice element 40, further with a first intake cone 54 cooperating with the check edge 64 of the shutoff needle 60. An end element 56 engages a centering seat 86 in the mold inserts 12 and comprises a further cone 57 for the shutoff needle 60.

The insert 50 is fitted with a support flange 52 between the neck segment 53 and the end element 56, said flange 52 resting by means of an axially shaped, annular rib 82 on the offset 14 of the mold inserts 12. On the other hand the top side of the flange 52 bounding the displacement gap 88 is flat. When the needle shutoff nozzle 10 reaches its operating temperature, said top side lies flat against the nozzle orifice element 40.

The cylindrical end element 56 adjoins the flange 52 coaxially with the longitudinal axis L and at its end constitutes the gate aperture 18 and, therein, the sealing seat D for the shutoff needle 60. Moreover a guide segment 55 and a second cone 57 are configured in the end element 56. FIG. 4 shows how the shutoff needle 60 moves from an open position into its closed position, the shutoff element 65 engaging the sealing seat D in geometrically hugging manner and thereby closing the gate aperture 18. In the process, by means of its sealing edge 66, the shutoff element 65 may enter some distance into the mold nest.

The nozzle orifice element 40 and the insert 50 are separate parts in the embodiment mode of FIG. 4, the nozzle orifice element 40 being firmly affixed in the nozzle casing 20 and consisting of a highly thermally conducting material and the longitudinally displaceable insert 50 being made of a high-strength material.

On the other hand, the embodiment mode of an injection molding nozzle 10 shown in FIG. 5 provides that the nozzle orifice element 40 and the insert 50 be integral and consist as a whole of a material of high thermal conductivity. The nozzle part 40, 50 is inserted from below in longitudinally displaceable manner into the nozzle casing 20, the insert 50 again resting by its circumferential rib 82, formed at the flange 52, on the step 14 of the mold inserts 12. On the other hand the nozzle orifice element 40 encounters a stop 22 within the nozzle casing 20, for instance in the form of a conical collar.

FIG. 5 also shows that the circumferential rib 82 formed at said flange constitutes a comparatively small contact surface and that the end element 56 longitudinally engaging the seat 86 exhibits reduced wall thickness. In this manner heat transfer from the thermally well conducting nozzle part 40, 50 to the mold inserts 12 is minimized. In this manner, being in direct contact with the mold inserts 12, the end element 56 of the insert 50 almost assumes the temperature of said inserts. However, on account of the thin wall of the end element 56 and due to an additional air gap 87 subtended between the end element 56 and the mold inserts 12, such heat losses are kept relatively small. The wall of the end element 56 can be made thinner by using an appropriate step 81, that is by reducing the outside diameter. Again the inside borehole 59 may also be made stepped or conical. The step 81 advantageously may be configured inside the preferred annular air gap 87, whereby a relatively steep temperature gradient may be set up therein.

This embodiment mode offers another significant advantage in that the runner 30 passing through the nozzle part 40, 50 almost as far as the gate aperture 18 will always be optimally temperature-controlled. As a result formation of a so-called cold plug in front of the gate aperture 18 is precluded and productivity is enhanced. At the same time the nozzle part 40, 50 can be easily and conveniently exchanged in case of wear or a change in geometry, merely by being pulled out of the nozzle casing 20 and by inserting a replacement.

As FIG. 5 shows, the nozzle part 40, 50 also may comprise an intake cone 54 for the shutoff needle 60. Said cone merges in the region of the end element 56 of the insert 50 into the guide segment 55 which terminates at a second cone 57. This cone 57 issues directly into the gate aperture 18.

FIG. 6 shows an injection molding nozzle 10 without shutoff needle 60 with an open gate 90 constituted end-wise by the end element 56 of the insert 50. Said insert is also integral with the nozzle orifice element 40 in this embodiment mode and together with this nozzle orifice element 40 it is inserted in longitudinally displaceable manner from below into the nozzle casing 20. In this design the flange 52 of the insert 50 rests by its plane contact surface 51 on a cylindrical support bush 70 made from a poorly thermally conducting material. Said bush is concentric with the longitudinal axis L and it is inserted in longitudinally displaceable manner in the seat 86 of the mold inserts 12.

The end element 56 of the insert 50 tapers conically at its outer circumference to allow a gate aperture 18 also of conical design to be moved close to it. In this manner the direct contact taking place between the melt being processed and the mold inserts 12 will be minimized. An air gap 92 subtended between the support bush 70, the nozzle part 40, 50 and the mold inserts 12 assures thermal insulation between the injection molding nozzle 10 and the mold insert 12, 13.

FIG. 7 shows a modified embodiment mode. Herein the support bush 70 longitudinally displaceable in the seat 86 constitutes the gate aperture 18 and hence a portion of the mold nest wall. Coaxially with the longitudinal axis L, said bush is fitted with a flange rim 72 which by means of an axial circumferential rib 73 rests on the step 14 of the mold inserts 12. Furthermore another support ring 74 is configured between the nozzle casing 20 and the support bush 70 and by means of an annular rib 75 is fitted radially into the mold inserts 72 and will rest by means of an axial rib 76 on the support bush 70 when reaching the operational temperature.

In this embodiment mode too the nozzle part 40, 50 inserted into the nozzle casing 20 and the support bush 70 displaceably guided in the mold inserts 12 constitute a plug-in system which always assures optimal length compensation and allows being exchanged without resort to any tool, namely in that the components 40, 50, 70 will be merely pulled out of their supports and then replaced by plugging-in new ones. In operation, the nozzle part 40, 50, the support bush 70 and the support ring 74 are clamped between the nozzle casing 20 and the mold inserts 12, whereby all are reliably secured. Separate or additional fasteners are not needed.

As regards the embodiment mode of FIG. 8, the insert 50, respectively the integral nozzle part 40, 50, constitute end-wise an altogether conical nozzle tip 94 fitted illustratively with three circumferentially distributed discharge boreholes 95. Said boreholes connect the runner 30 to the gate aperture 18 which is constituted by the mold inserts 12. In this embodiment mode too the insert 50, which is inserted in longitudinally displaceable manner in the nozzle casing 20 together with the nozzle orifice element 40, rests by its flange 52 on a thermally poorly conducting support bush 70 that bounds an air gap 92 toward the nozzle tip 94 and the mold inserts. Said airgap improves thermal insulation between the nozzle 10 and the insert 12, 13.

The design shown in FIG. 9 is similar to that shown in FIG. 7, except that the insert 50 respectively the nozzle part 40, 50 assumes a geometry corresponding to that shown in FIG. 8. The cone tip 94 projects through the gate aperture 18, which is also conical, and hence beyond the parting plane 16. The gate aperture 16 is subtended by the support bush 70.

The present invention is not limited to the above described embodiment modes, instead it may be modified in many ways. Illustratively one anti-rotation lock each may be provided between the nozzle orifice element 40 and the nozzle casing 20, between the insert 50 and the nozzle orifice element 40, and/or between the insert 50 and the mold inserts 12, in order to impart a preferred direction to the individual components. Also the insert 50, which is fitted with the nozzle tip 94, may be designed for lateral (multiple) gating.

The sealing seat D for the shutoff needle 60 in the insert 50 is not mandatorily cylindrical. Said seat illustratively may also be conical in order to allow receiving a shutoff needle 60 which in turn is conical in the end region 65. In such a design the cylindrical guide segment is eliminated because the passage 59 is conical altogether. Significantly the sealing seat D and also the gate aperture 18 remain configured in the insert 50 respectively in its end element 56 in order that these important mold regions which are very sensitive to the materials being processed always can be exchanged rapidly and conveniently.

To increase the service life of the injection molding nozzle 10, the nozzle orifice element 40 integral with the insert 50 may be made where called for of a material both having high thermal conductivity and high resistance to wear.

It is understood that the invention relates in general to a nozzle 10 applicable to injection molding and fitted with at least one runner 30 within a nozzle casing 20 to move injected molding material to be processed. At its lower end, the runner 30 is connected to allow material flow by means of a nozzle orifice element 40 and an insert 50 where called for at least to one mold cavity which is constituted by a mold insert 12, 13 of an injection mold. The insert 50 is configured in limited longitudinally displaceable manner in the nozzle orifice element 40 in the lower end of the runner 30. Said insert further constitutes a gate aperture 18. As regards a needle shutoff valve 10, a shutoff needle 60, which is displaceable between an open and a closed position, passes through the runner 30 and the insert 50 which altogether constitute a centering element wherein for instance an intake cone 54 centers the intrinsic shutoff element 65 of the needle 60. The thermally highly conducting nozzle orifice element 40 encloses the upper portion 53 of the insert 50 and can be inserted from below, for instance by screwing or being longitudinally displaced into the nozzle casing 20. Alternatively the nozzle orifice element 40 and the insert 50 are integral and both are jointly inserted in longitudinally displaceable manner into the nozzle casing 20. Said insert or centering element 50 is fitted with a support flange 52 to secure the nozzle orifice element 40 and/or the insert 50 firmly and reliably.

All features and advantages explicit or implicit in the description and drawing, including tangible design details and spatial arrangements, may be construed per se or in any combination as being part of the present invention.

LIST OF REFERENCES

| | |
|---|---|
| D | sealing seat |
| L | longitudinal axis |
| 10 | injection molding nozzle |
| 11 | housing |
| 12 | tool/mold insert |
| 13 | tool/mold insert |
| 14 | step |
| 15 | airgap |
| 16 | parting plane |
| 17 | material feed aperture |
| 19 | precentering |
| 20 | nozzle casing |
| 22 | stop |
| 30 | runner |
| 40 | nozzle orifice element |
| 50 | insert/centering element |
| 51 | contact surface |
| 52 | flange |
| 53 | neck segment |
| 54 | first intake cone |
| 55 | guide segment |
| 56 | end element |
| 57 | second cone |
| 58 | end face |
| 59 | passage |
| 60 | shutoff needle |
| 62 | needle segment |
| 63 | transition |
| 64 | check edge |
| 65 | sealing element |
| 66 | sealing edge |
| 68 | clearance/recess |
| 70 | support bush |
| 72 | flange rim |
| 73 | circumferential rib |
| 74 | support ring |
| 75 | annular rib |
| 76 | axial rib |
| 82 | circumferential rib |
| 86 | seat |
| 87 | airgap |
| 88 | displacement gap |
| 90 | open gate |
| 92 | airgap |
| 94 | nozzle tip |
| 95 | discharge borehole |

The invention claimed is:

1. An injection molding nozzle (10) for use in an injection mold, comprising a nozzle casing (20) containing at least one runner (30) for an injection material to be processed and a nozzle orifice element (40) connected to the nozzle casing (20) to allow injection material flow, and an insert (50) configured end-wise at or in the nozzle orifice element (40), to a mold cavity constituted by at least one set of inserts (12, 13), the nozzle casing (20), the nozzle orifice element (40), and the insert (50) allowing injection material flow, whereby the insert (50) configured in the nozzle orifice element (40) is longitudinally displaceable and whereby the insert (50) is clamped between the nozzle casing (20) and the mold insert (12, 13) during operation of the injection molding nozzle (13), wherein a support bush (70) is configured between the insert (50) and the mold inserts (12).

2. Injection molding nozzle as claimed in claim 1, characterized in that the insert (50) may be plugged into the nozzle orifice element (40) by means of a neck segment (53).

3. Injection molding nozzle as claimed in claim 1, characterized in that the insert (50) is fitted with a flange (52) which rests axially against the mold insert (12) and/or against the nozzle orifice element (40).

4. Injection molding nozzle as claimed in claim 1, characterized in that the insert (50) has an end element which enters the mold insert (12) (56).

5. Injection molding nozzle as claimed in claim 4, characterized in that the end element (56) is fitted with, or constitutes, a gate aperture (18).

6. Injection molding nozzle as claimed in claim 1, characterized in that the end element (56) constitutes, respectively bounds, a portion of the mold cavity.

7. Injection molding nozzle as claimed in claim 4, characterized in that the end element (56) matches at least segment-wise the mold inserts (12).

8. Injection molding nozzle as claimed in claim 1, characterized in that the insert (50) constitutes a centering element centering the injection molding nozzle (10).

9. Injection molding nozzle as claimed in claim 1, characterized in that an airgap (87) is subtended between the insert (50) and the mold inserts (12).

10. Injection molding nozzle as claimed in claim 1, characterized in that the material of the nozzle orifice element (40) is thermally highly conducting.

11. Injection molding nozzle as claimed in claim 1, characterized in that the material of the insert (50) is thermally highly conducting or thermally poorly conducting.

12. Injection molding nozzle as claimed in claim 1, characterized in that the nozzle orifice element (40) and the insert (50) are integral and made of the same material.

13. Injection molding nozzle as claimed in claim 1, characterized in that the insert (50) is made of a wear-resistant material.

14. Injection molding nozzle as claimed in claim 1, characterized in that the nozzle orifice element (40) and/or the insert (50) constitute(s) an open gate (90).

15. Injection molding nozzle as claimed in claim 1, characterized in that the nozzle orifice element (40) and/or the insert (50) comprise(s) a conical nozzle tip (94) projecting as far as a parting plane (16) or beyond it.

16. Injection molding nozzle as claimed in claim 1, characterized in that the support bush (70) is longitudinally displaceable and clamps the injection molding nozzle (10) during operation between the insert (50) and the mold inserts (12).

17. Injection molding nozzle as claimed in claim 1, characterized in that the support bush (70) bounds an airgap (92).

18. Injection molding nozzle as claimed in claim 1, characterized in that the support bush (70) subtends the gate aperture (18).

19. Injection molding nozzle as claimed in claim 1, characterized in that the support bush (70) constitutes respectively bounds a portion of the mold cavity.

20. Injection molding nozzle as claimed in claim 1, characterized the injection molding nozzle (10) is a hot runner nozzle or a cold runner nozzle.

21. Injection molding nozzle as claimed in claim 1, wherein the runner (30) and nozzle orifice element (40) do not have a shutoff needle.

* * * * *